United States Patent [19]

Burig et al.

[11] 4,093,904

[45] June 6, 1978

[54] MULTI-AXIS MOTION GENERATOR UTILIZING FEEDFORWARD CONTROL

[75] Inventors: Robert G. Burig, Allison Park; Paul F. McNally, Gibsonia, both of Pa.

[73] Assignee: Contraves Goerz Corporation, Pittsburgh, Pa.

[21] Appl. No.: 655,072

[22] Filed: Feb. 4, 1976

[51] Int. Cl.² .................................................. G05B 5/01
[52] U.S. Cl. ..................................... 318/616; 318/85; 318/675; 364/116
[58] Field of Search ............... 318/561, 632, 616, 618, 318/85, 675; 235/150.1; 364/116

[56] References Cited

U.S. PATENT DOCUMENTS

| 3,408,549 | 10/1968 | Shimabukuro | 318/85 |
| 3,798,430 | 3/1974 | Simon et al. | 235/151.11 |

Primary Examiner—Robert K. Schaefer
Assistant Examiner—John J. Feldhaus
Attorney, Agent, or Firm—Robert D. Yeager; Howard G. Massung

[57] ABSTRACT

Apparatus for generating synchronized multi-axis intermittent motion utilizing electronic encoding, memory and a position control system having feed-forward control. A plurality of slave shafts are rapidly and accurately positioned in response to the positioning of a rotatable master shaft, without mechanical interconnections therebetween. An analog transducer is attached to the master shaft providing an analog position output which is fed to a master encoder which feeds a digital output to a plurality of independent digital memory devices. Each digital memory device provides, in response, an output digital signal indicative of the desired position of an associated slave shaft. The output of each memory device, through an appropriate digital-to-analog converter, is fed to a position controller which positions the associated slave shaft as desired. The servo controller includes a feedforward input to speed positioning and reduce system lag. The feedforward velocity signal is obtained by calculating the difference between the present position of the associated slave shaft and the desired future position of the slave shaft to obtain the desired change in the slave shaft position. This difference is multiplied by the absolute value of the master axis velocity to obtain the necessary velocity feedforward signal. The velocity feedforward signal, which is a function of the change in slave shaft position and the velocity of the master shaft represents the velocity at which the slave shaft must be rotated to achieve the desired position while the master shaft moves through one digital increment.

12 Claims, 7 Drawing Figures

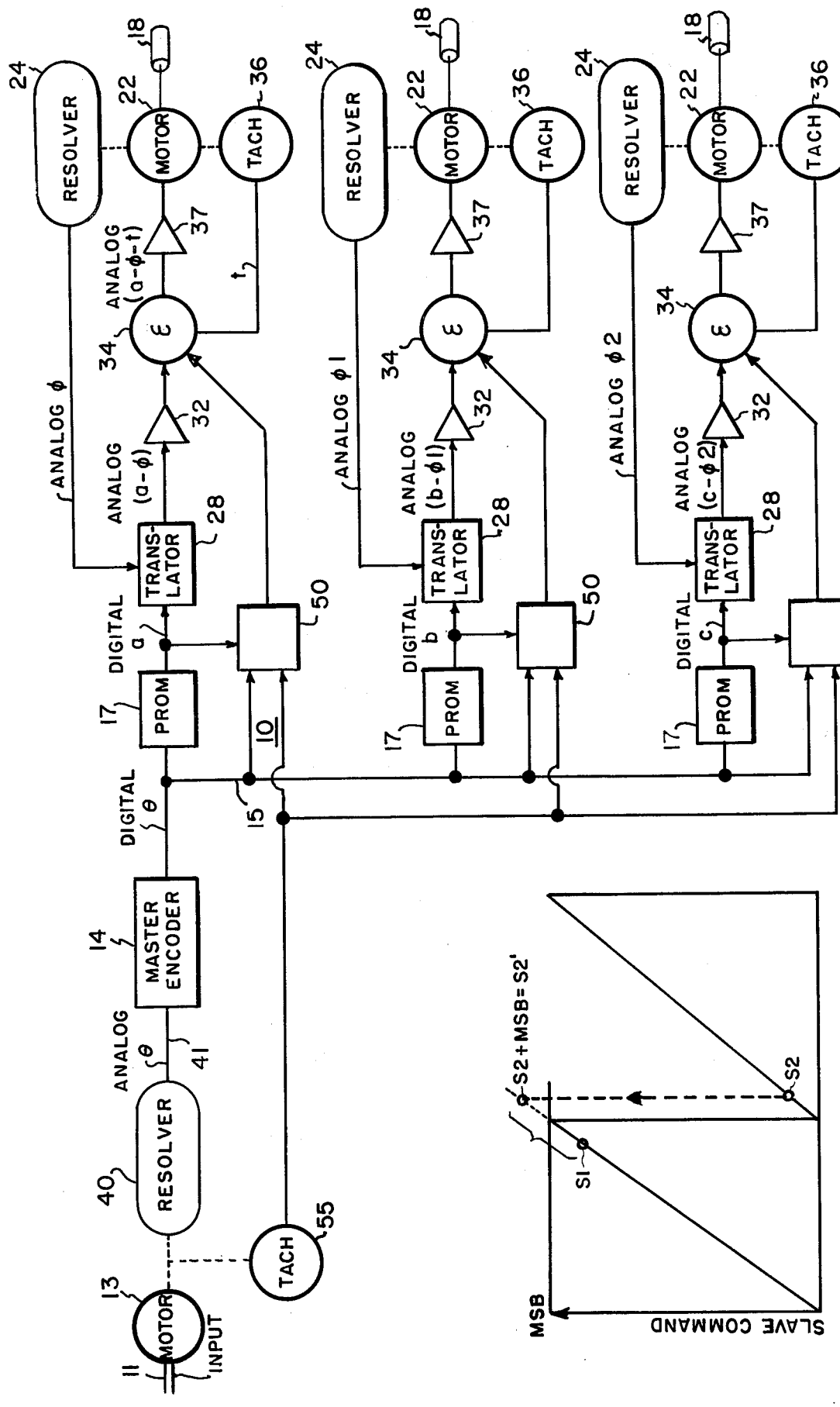

MULTI-AXIS MOTION GENERATOR UTILIZING FEEDFORWARD CONTROL

CROSS REFERENCE TO RELATED APPLICATIONS

This application is related to copending application Ser. No. 629,029 entitled a Multi-Axis Electronic Profile Generator.

BACKGROUND OF THE INVENTION

1. Field of the Invention

This invention relates to apparatus for controlling a plurality of output shafts and more particularly to an electronic profile generator for positioning a plurality of shafts in response to a master axis motion input utilizing feedforward slave axis control.

DESCRIPTION OF THE PRIOR ART

In drive control, a profile is the description of the operation or movement of a motion drive, usually expressed as a time versus location curve for one full cycle of the driver or master shaft. That is, the control profile is a description of how the output position of a slave follows the master input position. In most prior art machine controls the slave outputs are usually driven mechanically by gears, cams, levers, chains, belts, or the like. The main drive shaft is driven through many cycles, and the slave shafts follow their predetermined profile position through each cycle to accomplish multi-step operations such as assembling, testing, or packing various items. The speed of the main drive shaft can vary and the speed and positioning of the associated shafts must also vary in synchronization.

Conventional prior art mechanical drive controls provide power takeoff for each motion drive from a main mechanical line shaft. A heavy machine support base is required to maintain alignment of the line shaft and power takeoffs. Many mechanical components with inherent friction and inertia are required, resulting in drive power waste. Machine timing is difficult to set or change and the high mechanical wear rate tends to alter timing after a period of operation. It is difficult to alter motion amplitude, velocity, or acceleration; and, such changes require installation of change parts such as new gears, sprockets, cams or the like. Mechanical over load clutches are required for torque control.

SUMMARY OF THE INVENTION

An electrical multi-axis positioner for positioning a plurality of slave shafts in response to the position of a rotating master shaft is provided. A master shaft encoder connected to the master shaft provides a digital master shaft position indication which is fed to a plurality of electronic memory devices. Each memory device provides a stored digital slave shaft position indication in response to the digital master shaft position. Positioning means is connected to the output of each memory device for positioning an associated slave shaft to the digital slave shaft position indicated by the output of the memory device as a function of the master shaft velocity and the change in slave shaft position. The slave shaft is moved to the desired position before the master shaft digital position indication changes to the next desired position. That is, the slave shaft is moved to the desired position before the master shaft rotates through an angle equivalent to one digital increment. This construction limits lag and assures that the slave shafts will move in close synchronization with movement of the master shaft. The positioning means can comprise a servo positioning portion which moves the shaft in response to an error signal, indicative of the difference between the desired shaft position and the present shaft position, and a feedforward section, which provides a signal related to the velocity of the master shaft, to rapidly move the slave shaft to the desired position. The disclosed controller thus decreases slave shaft positioning time as the velocity of the main shaft increases.

In a positioning system wherein slave shaft position is not controlled as a function of the velocity of the master shaft a variable lag time error is introduced which greatly limits operating speeds. In the disclosed apparatus a feedforward signal is provided to reduce the system lag. If system lag is not kept low, slave shafts cannot be operated in close synchronism with respect to the master shaft.

In one embodiment of the invention an electronically controlled position generator utilizes an analog transducer which can be a potentiometer or resolver, connected to the rotating main shaft to provide a high accuracy analog indication of the master shaft position. The analog transducer feeds an analog-to-digital converter which provides a high accuracy digital representation of the master position. The output of the analog-to-digital converter is fed to a plurality of independent memory devices which provide a stored digital output signal representing the desired position of an associated slave shaft. The outputs of the memory devices are fed to digital-to-analog converters which control a servo system for positioning a slave shaft axis. A feedforward signal obtained from a feedforward circuit, having a tachometer connection to the rotating master shaft, is also provided for positioning the associated slave shaft. The disclosed system provides programmable slave axis motion which is synchronized to a master axis. Each independent memory device contains the desired positions of an associated slave shaft with respect to the digital position of the master shaft. The desired slave shaft positions or profile can be altered by changing the data stored in the memory device. The output of each memory device is a discrete stored command word for each digital input address.

In another embodiment rather than having individual memory devices and a velocity feedforward calculator these functions are obtained in a general purpose digital computer. That is, the computer provides the memory and calculates the feedforward for each slave axis in accordance with a predetermined function. The computer can be supplied with a single input from which both the rate and position of the master axis can be determined and supplies outputs to each slave positioner representing the desired slave position and velocity.

In another embodiment of the invention a master resolver is connected to sense position of the main drive motor. The information from the resolver is processed by a master encoder which yields a digital output signal. The digital output signal is fed to a plurality of independent memory devices. A programmable read only memory (PROM) can be utilized as the memory device. The output of each PROM is fed to an associated translator, which in conjunction with a servo motor, position the associated slave shaft. A feedforward signal is provided to the servo control system for reducing system lag. The velocity feedforward signal is calculated each time the digital master axis position changes by one increment. The velocity feedforward signal is calculated by comparing the present slave digital position, from the memory device, with the desired digital position, from the memory device, determining the difference, and multiplying this difference by the master axis velocity signal. The feedforward signal provided will cause the associated slave axis to move to the desired position before the master axis digital output changes to the next desired position. The position of the slave shaft is sensed by a slave shaft position transducer, such as a potentiometer or resolver, which feeds the signal to the translator providing the analog output error signal used in positioning the servo motor. A tachometer is provided for speed control of the slave servo motor.

Preferably, resolvers are used for providing the analog position of the master and slave shafts due to their high accuracy and rugged construction. However, it is contemplated that in some applications other devices having position related functions such as potentiometers may be useful. Whenever the term resolver is used herein, in the specification or claims, it means resolver, synchro, differential transformer, control transformer or other sinosoidal position indicating devices.

In the disclosed control system an individual drive is provided for each desired motion, thus power is delivered to the servo motor in close proximity to where the mechanical motion will be utilized. Line shafts and power takeoffs are eliminated providing for a smaller lighter machine. A smaller, lighter machine will run faster and more efficiently. Fewer parts and easier change over of the machines operating characteristics is possible.

It is an object of this invention to teach electrical control of a plurality of slave shafts in relationship to the positioning of a rotating master shaft comprising a master encoder, a plurality of memory devices and a positioner using feedforward velocity control.

It is another object of this invention to teach an electrical positioner utilizing a master shaft encoder, a memory addressed by the digital output of the master shaft encoder, and positioning means connected between the memory device output and a slave shaft for positioning the slave shaft as a function of the master shaft velocity and the desired change in slave shaft position.

BRIEF DESCRIPTION OF THE DRAWINGS

For a better understanding of the invention, reference may be had to the preferred embodiments exemplary of the invention shown in the accompanying drawings in which:

FIG. 5 is a graphical representation of the operation of the roll over detector shown in FIG. 4 for zero transitions;

FIG. 6 is a block diagram of a multi-axis profile generator constructed in accordance with the teaching of the present invention; and, FIG. 7 is a block diagram utilizing a computer to supply the position command and rate command to each slave axis.

DESCRIPTION OF THE PREFERRED EMBODIMENTS

Figure 1:
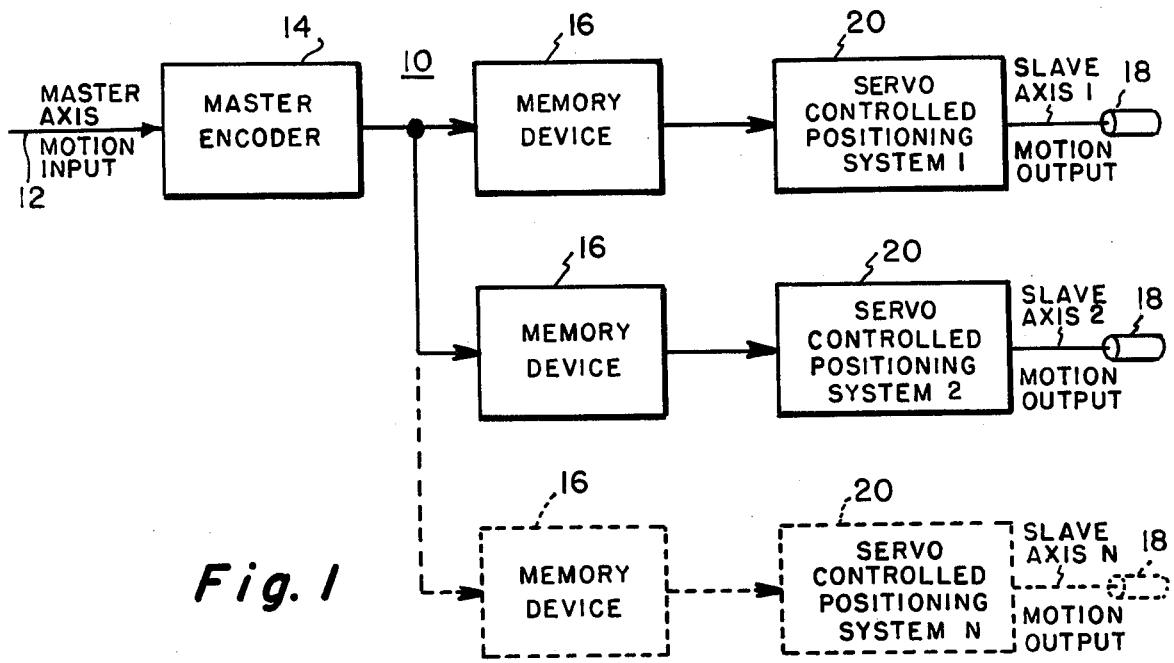
FIG. 1 is a block diagram of a machine profile drive control constructed in accordance with the teaching of the present invention.

Referring now to the drawings, and FIG. 1 in particular, there is shown the controls for a multi-axis profile generator 10 which can utilize the teaching of the present invention. A master axis motion input 12 is provided to a master encoder 14. Master encoder 14 activates a plurality of memory devices 16, the outputs of which control servo positioning systems 20. Each servo controlled positioner 20 controls motion of a slave axis 18. Controller 10 provides for generating multi-axis intermittent motion by means of electronic encoder 14, memory 16 and servo controller 20. Position controller 10 provides for programmable motion of a plurality of slave axes 18 which are synchronized to a master axis motion input 12 by way of master encoder 14. The master axis encoder provides a digital output representative of the actual master axis position. The digital output is absolute and non-ambiguous.

The digital output is absolute since it will accurately provide a digital indication of the resolver shaft position even after a temporary power interruption. Some conventional absolute digital encoders utilize multiple gear discs in an arrangement wherein each disc is read by a light source and photo-cell arrangement. Experience has shown in many industrial applications that vibration and handling of these type encoders has caused substantial maintenance and down time. The encoder 14 in the preferred embodiment utilizes a resolver 40, which is of a relatively simple rugged construction for sensing master shaft position. In a preferred embodiment the tracking angle encoder as described more fully in U.S. Pat. No. 3,984,831 is utilized to generate the master axis position in the form of a ten bit binary word. The master axis position word defines the master position to a resolution of $360°/2^{10}$ and divides the master axis shaft position into 1024 discreet increments over one revolution. Each increment represents approximately 0.35+°. The master axis position word is absolute and non-ambiguous over one complete memory cycle. The digital master axis position word is applied to a memory device, one device is required for each axis to be synchronized, and acts as an address for the memory device. Thus, a plurality of memory devices 16 are connected to the output of master encoder 14. The output of each memory device is a discreet stored command word for each input address. In an embodiment for a ten bit binary word there are 1024 stored commands in the memory device. The output of each memory device feeds a servo positioning system 20 as shown in FIG. 2.

Figure 2:
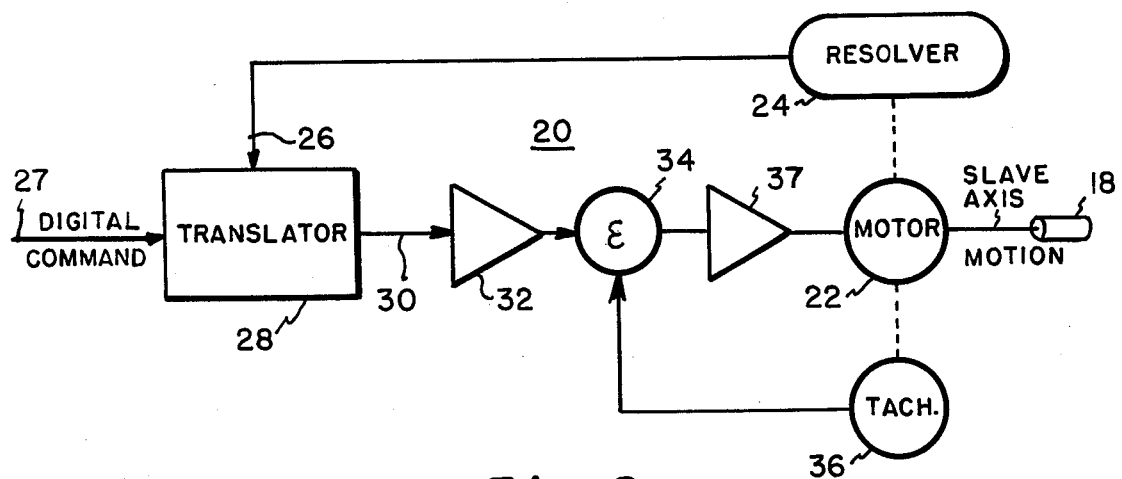
FIG. 2 is a block diagram of a servo controller operable in response to a digital command input.

FIG. 2 shows a servo controller wherein a servo motor 22 drives a slave axis 18. A resolver 24 is connected to the slave motor 22 and provides an analog indication of the position of servo motor 22 which is fed to the analog input 26 of translator 28. A digital command from memory device 16 is fed to the digital input 27 of translator 28. The output of translator 28 along line 30 is an analog signal representing the difference between the analog input 26 and the digital input 27. The signal along line 30 is strengthened by amplifier 32 and summed at junction 34 with a signal from a tachometer 36. Tachometer 36, which is connected to servo motor 22, provides a signal indicative of servo motor 22 velocity. The combined tachometer and error signal from the output of junction 34 is amplified by amplifier 37 and fed to servo motor 22. In operation servo 20 tends to move to a position where the error signal along line 30 is zero and slave axis 18 is at the desired position indicated by the digital command from memory device 16.

Figure 3:
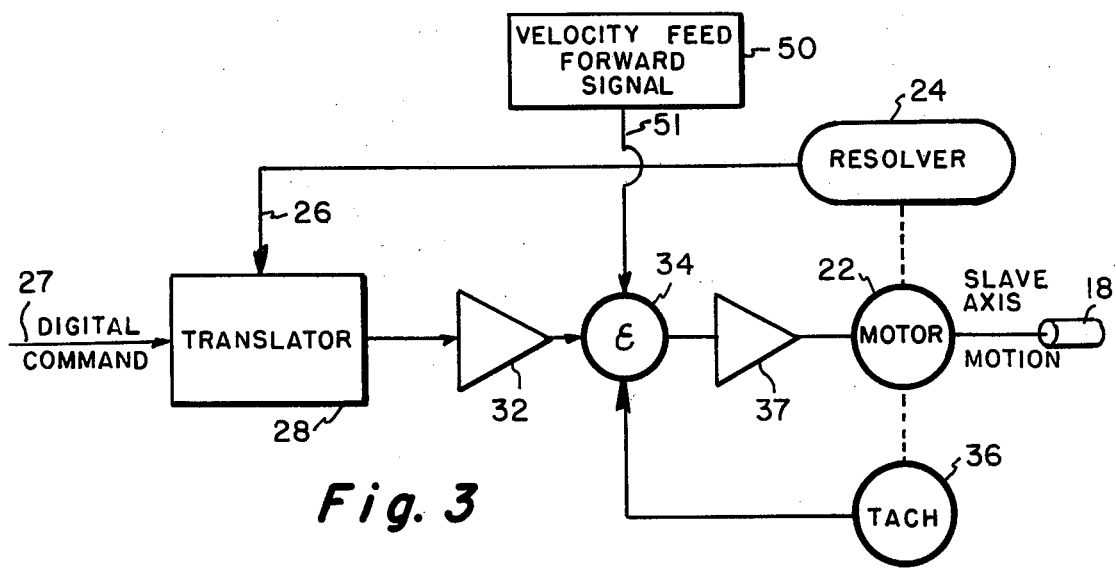
FIG. 3 is a servo controller similar to that schematically shown in FIG. 2 with the addition of a velocity feedforward input.

A potential problem arises in the servo controlled positioning system shown in FIG. 2. In order to operate an error signal must be present on the input to summing junction 34 from the analog output of translator 28. This error signal is derived from the difference between the command position from memory device 16 and the feedback position from resolver 24. In the system 20 shown in FIG. 2, a position error proportional to the desired slave axis speed must exist for the system to run at a speed other than zero. At high speeds the position error can be large which implies that the slave is not exactly following the stored profile. Depending on the speed at which the system operates this lag can have a detrimental effect. A technique has been devised which eliminates the problem by providing an additional input to the velocity summing junction 34. This additional input, as shown in FIG. 3, is from a velocity feedforward network 50. The additional input to junction 34 along line 51 provides a signal which is equal to the desired rate of change of position of the stored profile. Velocity feedforward network 50 calculates what the slave velocity should be to have zero error, and supplies an appropriate feedforward velocity signal along line 51.

The Velocity Ratio is derived from a comparison of the change in slave position command as the master axis position word changes from one increment to the next. This expression of the feedforward Velocity Ratio can be derived as follows:

$$\text{Master Velocity} = \frac{\Delta \text{Master Position}}{\Delta t} = \frac{\Delta M}{\Delta t}$$

Desired Slave Feedforward Velocity Signal =

$$\frac{\Delta \text{Slave Position}}{\Delta t}$$

$$= \frac{\Delta S}{\Delta t}$$

$$\text{Velocity Ratio} = \frac{\text{Slave Velocity}}{\text{Master Velocity}} = \frac{\frac{\Delta \text{Slave Position}}{\Delta t}}{\frac{\Delta \text{Master Position}}{\Delta t}}$$

and by cancelling $\Delta t$ $$\text{Velocity Ratio} = \frac{\Delta \text{Slave Position}}{\Delta \text{Master Position}} = \frac{\Delta S}{\Delta M}$$

The velocity ratio thus represents the velocity of the slave axis with respect to the master. By multiplying the Velocity Ratio, ($\alpha S/\alpha M$), by the Master Velocity, ($\alpha M/\alpha t$), the desired slave velocity is obtained. Thus, if the Velocity Ratio, ($\alpha S/\alpha M$), is multiplied by the instantaneous master axis velocity, as obtained from a tachometer or other transducer, the desired velocity feedforward signal is generated. That is Slave Feedforward Velocity = Velocity Ratio × Master Velocity = ($\alpha S/\alpha M$) × ($\alpha M/\alpha t$) = ($\alpha S/\alpha t$)

The Slave Feedforward Velocity for each independent slave axis must be calculated for each incremental change in the motor position. That is, each time the master axis changes position by an angle equivalent to one digital increment a new slave feedforward signal for each slave axis is computed. Since the Velocity Feedforward signal is calculated for each unit increment change in the motor position, the term Δ Master Position for each calculation is equal to one and the Velocity Ratio per unit master increment is simply equal to the change in desired slave position ΔS. Thus the desired velocity feedforward signal equals the absolute master velocity x the change in slave position.

Velocity Feedforward = |Master Velocity|(ΔSlave Position)

$$= \left| \frac{\Delta M}{\Delta t} \right| \Delta S$$

The master velocity sign is not important since the slave term contains the sign information. The necessary terms for calculating the Velocity Feedforward can easily be obtained. Each slave shaft is thus positioned as a function of the master shaft velocity and the required change in slave shaft position. The block circuit, in FIG. 4, shows the preferred embodiment for obtaining the feedforward signal.

Referring now to FIG. 6 there is shown a more detailed block diagram of a servo controller 10 for controlling a plurality of slave axes 18 in response to the position of a master axis 11. Slave axes 18 are mechanically independent, however, they are usually cooperatively associated for performing various operations on an item. In the usual practice slave shafts 18 operate apparatus which perform sequential operations, such as assembly, on an item. A master resolver 40, is connected to master motor 13, and provides an analog signal along line 41 indicative of the position of master shaft 11. During operation motor 13 is continually in motion. Resolvers 40 are relatively rugged and provide a high degree of accuracy for determining the position of master axis 11. The analog signal along line 41 is fed to master encoder 14 which provides a digital signal along line 15 to a plurality of memory devices 17. Memory device 17 can be a programmably read only memory (PROM). The output is a digital signal which is fed to the digital input of translator 28. A PROM 17 is provided for each slave axis 18. Each PROM 17 has an output which is independent of the output of the other PROMs 17 and is determined by the digital input along line 15. The output of motor 22 is a motion which follows the profile stored in memory device 17, synchronized with the master axis position. Often the slave shaft motion is not continuous with respect to the master rotor.

Each PROM 17 provides the position command for the associated slave axis 18. Associated with each PROM 17 is a velocity feedforward calculator 50 which provides the velocity command signal to summing junction 34. The inputs to rate controller 50 are from a tachometer 55, connected to the master drive 13, and the input to and output from PROM 17. Controller 50 provides the proper signal for positioning the associated slave shaft. FIG. 4 shows a block diagram of the feedforward controller network 50.

Figure 4:
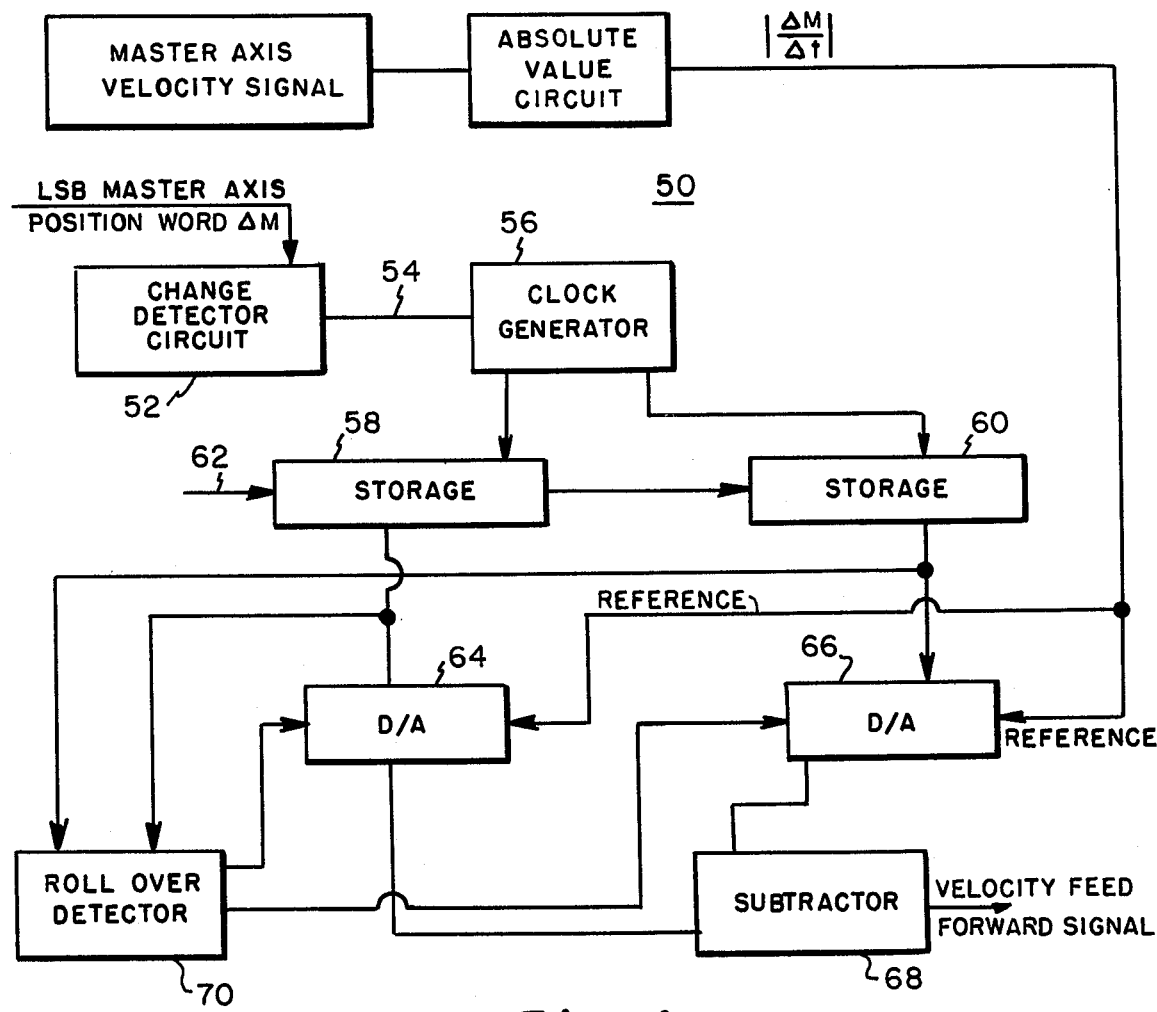
FIG. 4 is the block diagram of a circuit utilized for obtaining the desired velocity feedforward signal for the servo controller shown in FIG. 3.

Referring now to FIG. 4 there is shown a circuit 50 for obtaining the desired velocity feedforward signal. In the circuit 50 shown in FIG. 4 the least significant bit, LSB, of the master axis position word is applied to a change detector circuit 52 which emits a pulse on line 54 each time the master LSB changes state. The pulse, along line 54, is applied to a clock generator 56 which causes the present slave axis position, in digital form, contained in storage register 58 to be shifted to storage register 60. The digital representation of the desired slave position from memory device 16, on line 62, is then shifted into register 58. The data in the storage registers 58 and 60, representing the desired position and the present position respectively, are then applied to digital-to-analog converters 64 and 66. The reference for digital-to-analog converters 64 and 66 is the absolute value of the master velocity $|\Delta M/\Delta t|$ obtained from a master axis tachometer. This multiplies the present slave position, S1, and the desired slave position, S2, by the absolute master axis velocity. The output of digital-to-analog converters 64 and 66 are subtracted in subtractor 68 which generates the function $$|\text{Master Velocity}| (\text{Slave Position}_2 - \text{Slave Position}_1) =$$

$$|\text{Master Velocity}| \Delta \text{Slave Position} = \left| \frac{\Delta M}{\Delta t} \right| |\Delta S;$$

which is the required velocity feedforward signal.

A roll over circuit 70 monitors transition of the storage slave word through all zeros, 00000, to all the all ones, 11111, state and adds a most significant bit, MSB, 1 to the D/A converter 66 in the forward direction and a MSB 1 to the D/A converter 64 in the reversed direction. The added bit in either case extends the range of the appropriate D/A converter 64 or 66 so that the proper change in slave position is calculated through the zero transition.

Referring now to FIG. 5 a graphic representation of a zero transition is shown. S1 and S2 represent the sequentially stored slave position commands for a one increment change in the master position. Note that due to the roll over of the position command, the actual value of S2 is much smaller in magnitude than S1 even though the implied position command is larger. The roll over detector circuit senses the slave command roll over and adds a value equal to the MSB of the slave command being monitored by the D/A converter 64 or 66. The process of adding the most significant bit in effect pushes the S2 command back up to the proper value so that the change in slave position, $\Delta S$, is calculated correctly.

For example, for a unit having a 5 bit binary word capacity the roll over circuit 70 would function as follows. If S1 = 11110 and S2 = 00010 the roll over circuit would add a MSB1 to S2 yielding S2' = 100010 and S2' − S1 = 00100 which is the actual desired change in slave position.

In some applications there is no requirement for a master axis. In these cases a virtual master is provided by a digital counter which operates from a variable adjustable clock frequency and sequentially scans the memory devices. By this means the slave axes are synchronized through the virtual master and run at a speed set by the clock frequency.

By utilizing the disclosed technique the power output is provided where needed rather than taken off a drive shaft as in prior art mechanical system. This generates a whole new concept in machine tool design. A cam profile can be stored in memory and changed when necessary. As many slaves as desired can be synchronized with the positioning of the master axis. The positioning constraints of the prior art mechanical drives are eliminated.

Figure 7:
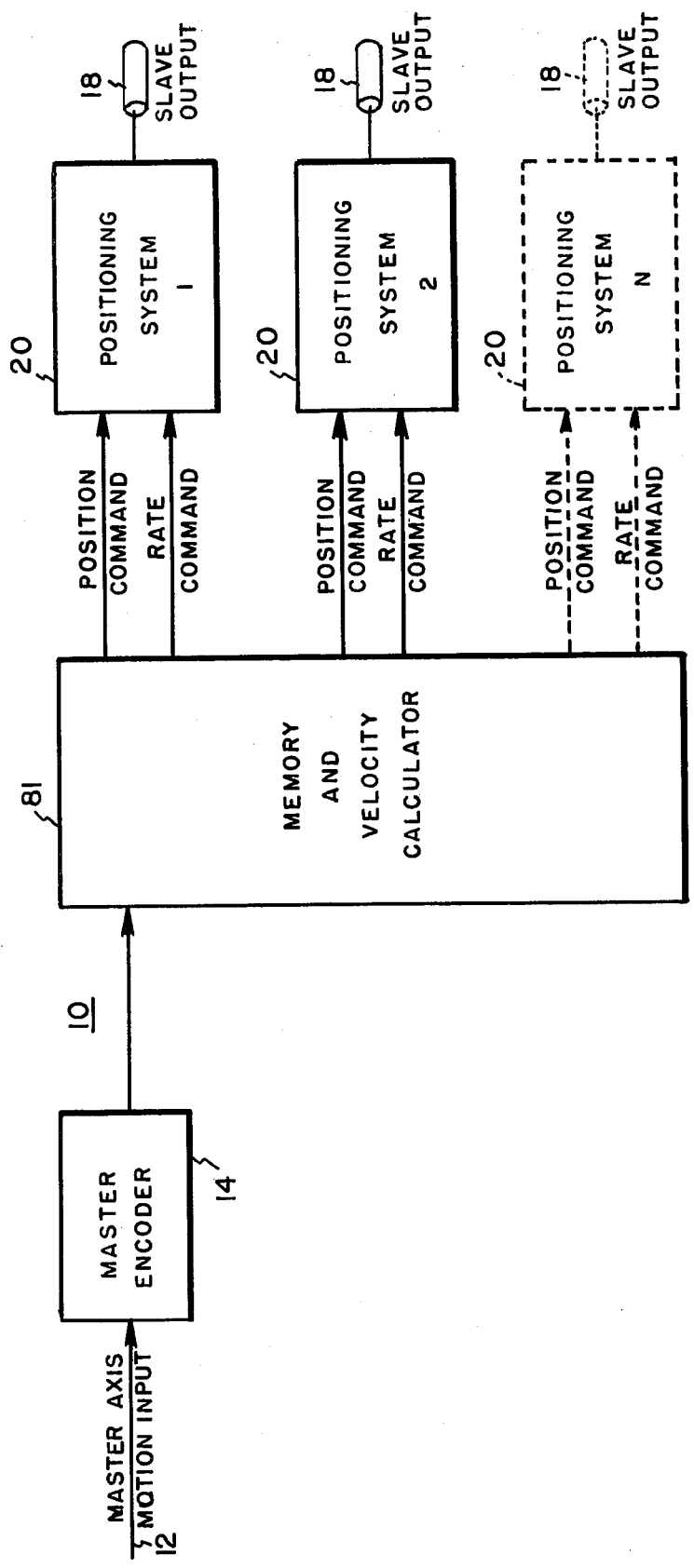

Referring now to FIG. 7 there is shown an embodiment wherein the function of the memory device 16 and feedforward network 50 are provided in a programmable computer. Computer 81 receives a single input from a master encoder 14 and by a selected algorithm or memory provides the position command to a positioning system 20 for a slave axis 18. Computer 81 can also be programmed to calculate the necessary feedforward velocity for proper positioning of shaft 18. A rate command signal can be provided to the positioning system 20. That is computer 81 can be constructed to provide an output to each slave positioner 20 which represents the desired position and the necessary velocity. Computer 81 can thus cause each slave axis 18 to be positioned as a function of the master shaft velocity and the required change in slave shaft position.

What is claimed is:

1. An electrical positioner for positioning a slave shaft in response to the position of a continuously rotating master shaft comprising:
    a master shaft encoder providing a digital master shaft position indication;
    position determining means connected to said master shaft encoder and providing a digital slave shaft position in response to the digital master shaft position;
    a first digital storage connected to and storing the digital output of the associated position determining means;
    a second digital storage device;
    a shifting means for shifting the digital signal stored in said first storage device to said second storage device when said master axis position changes by one digital increment;
    a pair of digital-to-analog converters connected to said first storage device and said second storage device for converting the digital outputs to analog outputs;
    multiplying means for multiplying the outputs of said digital-to-analog converters by the signal related to the velocity of the master axis;
    subtractor means for subtracting the analog signals out of said digital-to-analog converters providing a velocity feedforward signal;
    the velocity feedforward signal is calculated for each incremental change in the digital master shaft position; and,
    positioning means connected for positioning the slave shaft to the digital slave shaft position from said position determining means as function of the velocity feedforward signal.

2. An electrical positioner as claimed in claim 1 comprising:
    roll over compensating means connected to said pair of digital-to-analog converters for providing an appropriate correction signal when the indication in said first digital storage means or said second digital storage means goes through the zero transition.

3. Apparatus for positioning a slave shaft in response to the position of a master shaft comprising:
    a sequentially changing absolute non-ambiguous master shaft encoder providing a digital master shaft position indication;
    a memory device having an input address, connected to receive the digital master shaft position indication, and an output, providing a stored digital position indication in response to the input, which represents a desired slave shaft position;

positioning means connected between said memory device and the slave shaft for positioning the slave shaft comprising:

servo control means utilizing position feedback from the slave shaft to position the slave shaft at the position indicated by the output of the memory device, and feedforward velocity control means utilizing the change in slave shaft position indicated by the output of said memory device and the velocity of the master shaft to determine velocity to move the slave shaft toward the position indicated by the output of the memory device.

4. Apparatus for positioning a slave shaft in response to the position of a master shaft comprising:

a master shaft encoder providing a digital master shaft position indication;

a memory device having an input address, connected to receive the digital master shaft position indication, and an output, providing a stored digital position indication in response to the input, which represents a desired slave shaft position;

positioning means connected between said memory device and the slave shaft utilizing position feedback from the slave shaft to position the slave shaft at the position indicated by the output of the memory device;

a first storage means for storing the present output of said memory device;

a second storage means for storing the preceding output of said memory device;

master axis velocity means for multiplying the output of said first storage device and said second storage device by the velocity of the master axis;

digital to analog converter means for converting the output of said first storage device and said second storage device from a digital representation to an analog representation;

subtractor means for subtracting the outputs of said first storage device and said second storage device to provide a velocity feedforward signal; and, feedforward velocity control means utilizing the velocity feedforward signal to control the velocity at which the slave shaft is moved toward the position indicated by the output of the memory device.

5. Apparatus as claimed in claim 4 comprising:

roll over compensating means for providing correcting compensation when said first storage device or said second storage device goes through a zero transition.

6. An electrically controlled positioning system for synchronously positioning a plurality of slave shafts in response to the position of a rotatable master shaft comprising:

master transducer means connected to said master shaft for supplying an electrical output signal representative of the master shaft position;

an electronic memory device associated with each slave shaft having an input, connected to receive the output signal from said master transducer means, and each electronic memory device is independently programmed to provide simultaneously an individual output signal representative of the desired position of the associated slave shaft with respect to the master shaft position;

servo control means associated with each slave shaft connected between the slave shaft and said electronic memory device for positioning the slave shaft to the position indicated by said electronic memory device so that the plurality of slave shafts are simultaneously positioned in response to the master shaft position; and feedforward signal means connected to operate each servo controller means to position the associated slave shaft as a function of the desired change in slave shaft position and the velocity of the rotatable master shaft.

7. An electrically controlled positioning system for synchronously positioning a plurality of slave shafts in response to the position of a rotatable master shaft comprising:

master transducer means connected to said master shaft for supplying an electrical output signal representative of the master shaft position;

an electronic memory device associated with each slave shaft having an input, connected to receive the output signal from said master transducer means, and an output, supplying a signal representative of the desired position of the associated slave shaft with respect to the master shaft position;

servo control means associated with each slave shaft connected between the slave shaft and said electronic memory device for positioning the slave shaft to the position indicated by said electronic memory;

storage means for storing the present desired slave shaft position signal and the preceding slave shaft position signal;

subtractor means for subtracting the present desired slave position signal from the preceding slave shaft position signal;

multiplier means for multiplying the difference signal between the preceding desired slave shaft position signal and the present desired slave shaft position signal by a signal representative of the velocity of the master shaft to provide a velocity feedforward signal; and, said servo control means associated with each slave shaft utilizing the velocity feedforward signal to position the associated slave shaft as a function of the desired change in slave shaft position and the velocity of the rotatable master shaft.

8. An electrical controller as claimed in claim 7 comprising:

roll over compensation means to provide for the correct calculation of the velocity feedforward signal during zero transition cross over.

9. Apparatus for positioning a plurality of output shafts in response to the position of a master shaft comprising:

a resolver connected to the master shaft providing an analog electrical output indicative of the position of the master shaft;

an encoder having an input connected to the output of said resolver and an output providing a signal in digital form corresponding to its analog input;

a plurality of memory devices each of which can be independently programmed, and each having an input connected to the output of said encoder and having an output which provides a digital signal, determined by the digital input, representative of the desired output shaft position;

a translator associated with each memory device having an analog input, and an analog output providing the algebraic difference between the signals on said digital input and said analog input;

amplifier means connected to the output of said translator;

a servo motor connected to be driven by the output of said amplifier to position one of the plurality of output shafts;

a slave resolver connected to the associated output shaft supplying an analog signal representative of the position of the associated output shaft to the analog input of said translator; and, a feedforward network having a tachometer connected to the master shaft and digital storage connected to an associated memory device providing an output signal to the servo motor which is a function of the master shaft speed and the desired change in slave shaft position as determined by the difference between the present digital output signal from the memory device and the preceding digital output signal from the memory device.

10. A positioning system for positioning a plurality of slave shafts in response to the position of a rotatable master shaft comprising:

an analog transducer for sensing the master shaft position and providing an analog output signal representative of the master shaft position;

an analog-to-digital converter connected to said analog transducer providing a digital output signal representative of the master shaft position;

a plurality of independently programmable digital memory devices connected to said analog-to-digital converter each associated with one of the slave shafts and providing a digital output signal representative of the desired slave shaft position with respect to the master shaft position;

digital-to-analog converter means associated with each of said plurality of digital memory device providing an analog signal representative of the desired slave shaft position with respect to the master shaft position;

servo drive means associated with each digital-to-analog converter for driving the associated slave shaft to the desired position in response to the analog signal from said digital-to-analog converter means; and, feedforward drive means associated with each digital-to-analog converter for driving the associated slave shaft to the desired position as a function of the difference between sequential output signals of the associated digital memory device and the velocity of the rotatable master shaft.

11. Position control apparatus for positioning a plurality of slave members comprising:

master digital signal means for providing a sequentially changing digital signal;

position determining means associated with each sleeve shaft, each including an independently programmed memory for providing simultaneously a desired position for each slave member from the memory which is addressed by the digital signal from said master digital signal means; and, positioning means associated with each programmed memory device for positioning the associated slave member at its desired position comprising servo control means utilizing position feedback from the slave shaft to position the slave shaft at the position indicated by the output of the memory device, and feed forward velocity control means or positioning the slave shaft as a function of the rate of change of the sequentially changing digital signal and the required change in slave shaft position.

12. Position control apparatus as claimed in claim 11 comprising:

digital comparing means for storing and comparing the present desired digital position of a slave shaft and the preceding desired digital position of a slave shaft to determine the required change in slave shaft position; and roll over compensating means for providing correct computation of the required change in slave shaft position when a zero transition occurs between the preceding and present digital slave shaft position.

* * * * *

UNITED STATES PATENT AND TRADEMARK OFFICE
CERTIFICATE OF CORRECTION

PATENT NO. : 4,093,904
DATED : June 6, 1978
INVENTOR(S) : Robert G. Burig and Paul F. McNally It is certified that error appears in the above—identified patent and that said Letters Patent are hereby corrected as shown below:

Claim 7, line 23, after "slave" first occurrence, --shaft-- should be inserted.

Claim 11, line 6, "sleeve" should read --slave--.

Signed and Sealed this

Fifth Day of December 1978

[SEAL]

Attest:

RUTH C. MASON
Attesting Officer

DONALD W. BANNER
Commissioner of Patents and Trademarks